United States Patent Office 2,783,864
Patented Mar. 5, 1957

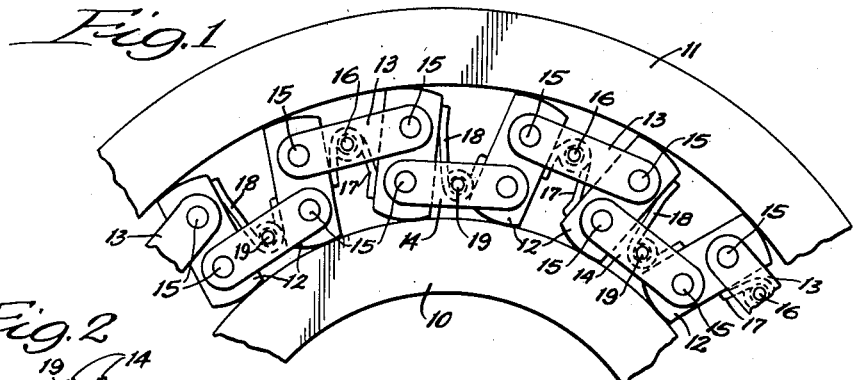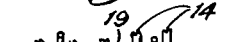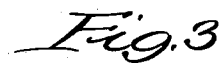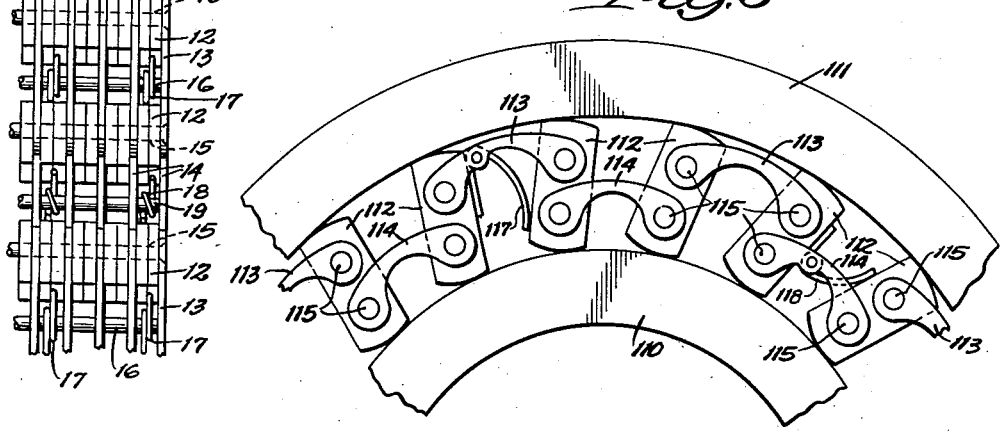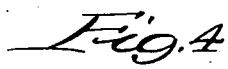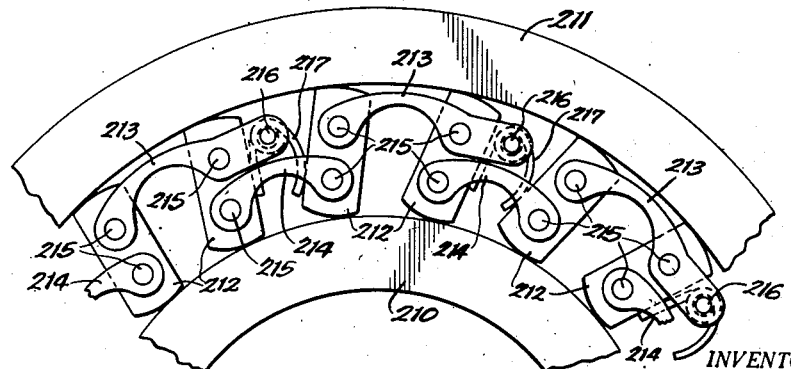

2,783,864

ONE WAY CLUTCH

Adiel Y. Dodge, Rockford, Ill.

Application April 26, 1954, Serial No. 425,634

7 Claims. (Cl. 192—45.1)

This invention relates to one way clutches and more particularly to a one way clutch of the tilting gripper type.

In tilting one way gripper clutches, it is necessary, especially during severe applications, that the grippers be connected for substantially simultaneous movement and that they also have a limited amount of relative movement to compensate for inaccuracies due to manufacture or to wear. Heretofore this has generally been accomplished by mounting the grippers in an annular cage. Such cages, however, tend to be relatively expensive and require a different cage unit for each different size of clutch.

It is one of the objects of the present invention to provide a one way clutch in which the grippers are connected directly to each other to move substantially simultaneously, but to have a limited movement relative to each other.

Another object is to provide a one way clutch in which the grippers are connected by links which hold the grippers assembled and properly spaced and which cause them to move simultaneously.

According to one feature of the invention, alternate pairs of grippers are connected by links spaced radially outward of the gripper centers and adjacent grippers of different pairs are connected by links spaced radially inward from the gripper centers.

Still another object is to provide a one way clutch in which the links are longitudinally resilient to accommodate relative movement of the grippers.

Yet another object is to provide a one way clutch in which springs act on the grippers urging them to hold to their wedging or engaging positions.

A further object is to provide a one way clutch which can easily be fabricated and assembled in substantially any desired size.

According to one important feature, the clutch is made from stamped or similarly fabricated parts similar to the parts of standard silent chains and assembled in substantially the same manner as a standard silent chain.

The above and other objects and features of the invention will be more readily apparent from the following description when read in connection with the accompanying drawing in which:

Figure 1 is a partial end elevation of a one way clutch assembly embodying the invention;

Figure 2 is a partial plan view of the one way clutch with the outer race omitted; and Figures 3 and 4 are views similar to Figure 1 of alternative constructions.

The clutch, as shown in Figures 1 and 2, is adapted to connect an inner cylindrical race 10 to an outer cylindrical race 11 for rotation together in one direction but for free relative rotation in the opposite direction. The clutch itself comprises a series of tiltable grippers 12 each having flat sides and ends curved about spaced centers. With this construction, when the grippers are tilted counterclockwise they will wedge between the races and connect the races together. When the grippers are tilted clockwise, they will disengage the races so that the races can rotate freely relative to each other.

The grippers are interconnected with each other by unitary simple links which normally constrain the grippers to tilt simultaneously so that all of the grippers will be effective through engagement and all of the grippers will release the races at the same time. Each of the links is pivotally connected to adjacent grippers at its ends and is free of connection to any other element between its ends which will exert a controlling force thereon so that it will move solely in response to forces imposed thereon through the pivotal connections to the grippers. The connection of the links to the springs 17 and 18 through the pins 16, as described hereinafter, are free floating connections which do not exert any force on the links. As shown, outer links 13 are pivotally connected at their ends to alternate pairs of grippers at points spaced radially outward from the gripper radial centers, that is, at points spaced radially from the radial center point of the grippers as measured on a radius through the axis of the races. Adjacent links of different pairs are connected by inner links 14 which are pivotally connected to the grippers at points spaced inward from their radial centers. As best seen in Figure 2, the grippers 12 are preferably made up of relatively short sections with the links lying between the sections. The several gripper sections are connected together and the links are pivotally connected thereto by pins 15 extending axially through the gripper and link assemblies.

The grippers are normally biased toward the engaging or wedging positions. The grippers are urged to tilt counterclockwise to their engaging position by spring means acting on the grippers at points spaced radially from their centers to exert a tilting couple thereon. For this purpose, in the construction shown, the outer links 13 carry a cross pin 16 upon which are wound at spaced points a series of coil springs 17. The springs 17 have central portions coiled about the pins 16 and short ends at one side engaging the right-hand faces of the grippers radially outward of their centers. The opposite ends of the springs 17 are longer and engage the left-hand faces of adjacent grippers radially inward of their centers. The springs thus tend to exert a tilting couple on the grippers urging them toward their engaged positions.

The spring action may be further increased where desired by providing additional springs 18 coiled about pins 19 carried by the inner links 14. The springs 18 have short ends engaging the left-hand faces of the grippers at points radially inward of their centers and engaging the right-hand faces of the grippers at points radially outward of their centers. These springs supplement the springs 17 to exert a tilting couple on the grippers so that they will engage rapidly when the inner race tends to rotate clockwise relative to the outer race.

In operation, when the inner race is turning clockwise, the grippers will wedge between the races and will connect them for simultaneous rotation. This action will occur rapidly due to the effect of the springs plus the frictional force of the races on the opposite ends of the grippers. Furthermore, due to the connection of the grippers by the links, the grippers will all tend to move simultaneously so that they will be equally effective in connecting the races. It will be noted, however, that because of the arrangement of the links with inner and outer alternate links, the grippers can have a limited amount of movement relative to each to compensate for inaccuracies due to manufacture or to wear. A certain amount of relative movement may also be provided by having a sloppy fit between the links and the pins 15 to provide a limited lost motion.

The construction of Figure 3 is substantially similar to that of Figure 1 and corresponding parts are indicated by the same reference numerals plus 100. In this construction, both the inner and outer links 113 and 114 are curved longitudinally to provide a relatively thin central section and are preferably formed of resilient material, such as spring steel. The links may therefore stretch or compress longitudinally to a limited extent to accommodate relative motion between the grippers. In this construction, the links preferably fit relatively tightly on the pins 115 and the springs 117 and 118 may be provided at only certain of the pairs of grippers to cause all of the grippers to tend to turn together through the links.

The construction of Figure 4 is generally similar to that of Figure 1 and corresponding parts therein are indicated by the same reference numerals plus 200. In this construction, the links 213 and 214 are made longitudinally resilient, as in Figure 3. The springs, however, instead of being mounted intermediate the links, are supported on pins 216 carried by extensions 221 and/or a part of the outer links 213. The springs, as shown at 217, are the same type of springs as those employed in Figure 1 and function in the same manner except for the difference in the manner of mounting.

While several embodiments of the invention have been shown and described herein, it will be understood that they are illustrative only and not to be taken as a definition of the scope of the invention, reference being had for this purpose to the appended claims.

What is claimed is:

1. A one way clutch for use with cylindrical coaxial races comprising a series of tiltable grippers formed with their opposite ends curved about spaced centers to wedge between the races when they are tilted in one direction and to disengage the races when they are tilted in the opposite direction, links connecting alternate pairs of grippers at points spaced radially outward from their centers, and links connecting the adjacent grippers of the different pairs at points spaced radially inward from their centers.

2. A one way clutch for use with cylindrical coaxial races comprising a series of tiltable grippers formed with their opposite ends curved about spaced centers to wedge between the races when they are tilted in one direction and to disengage the races when they are tilted in the opposite direction, links connecting alternate pairs of grippers at points spaced radially outward from their centers, links connecting the adjacent grippers of the different pairs at points spaced radially inward from their centers and springs engaging at least some of the grippers and urging them to tilt in a direction to wedge between the races.

3. The construction of claim 1 in which the links are longitudinally resilient.

4. A one way clutch for use with cylindrical coaxial races comprising a series of tiltable grippers formed with their opposite ends curved about spaced centers to wedge between the races when they are tilted in one direction and to disengage the races when they are tilted in the opposite directions, a series of links, each link being pivotally connected at its ends to adjacent grippers at points spaced from their radial centers to cause the grippers to tilt simultaneously and to limit relative tilting of the grippers, pins connecting the links spaced circumferentially from the grippers, and springs coiled around the pins with their opposite ends engaging adjacent grippers to urge the grippers to tilt in a direction to wedge between the races.

5. A one way clutch for use with cylindrical coaxial races comprising a series of tiltable grippers formed with their opposite ends curved to wedge between the races when they are tilted in one direction and to disengage the races when they are tilted in the opposite direction, each of the grippers carrying at least one pivot pin whose axis is fixed relative to the gripper, and a series of unitary simple links each freely pivoted at its opposite ends on the pivot pins on adjacent grippers and each being free of connection to any other link except through the grippers to move solely in response to forces imposed thereon through the pivot pins.

6. The construction of claim 5 in which each of the links is longitudinally curved to be longitudinally resilient.

7. A one way clutch for use with cylindrical coaxial races comprising a series of tiltable grippers formed with their opposite ends curved to wedge between the races when they are tilted in one direction and to disengage the races when they are tilted in the opposite direction, and a series of unitary simple rigid links each freely pivotally connected at its ends to adjacent grippers to cause the grippers to tilt simultaneously and to limit relative tilting of the grippers.

References Cited in the file of this patent

UNITED STATES PATENTS 2,570,290    Turner  ---------------- Oct. 9, 1951